(12) United States Patent
Bennett (10) Patent No.: US 8,892,588 B2
(45) Date of Patent: *Nov. 18, 2014

(54) SEARCH SYSTEM EMPLOYING MULTIPLE IMAGE BASED SEARCH PROCESSING APPROACHES

(71) Applicant: Enpulz, L.L.C., Chicago, IL (US)

(72) Inventor: James D. Bennett, Hroznetin (CZ)

(73) Assignee: Enpulz, L.L.P., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/662,807

(22) Filed: Oct. 29, 2012

(65) Prior Publication Data

US 2013/0054562 A1 Feb. 28, 2013

Related U.S. Application Data

(63) Continuation of application No. 13/481,996, filed on May 29, 2012, which is a continuation of application No. 12/185,796, filed on Aug. 4, 2008, now Pat. No. 8,190,623.

(60) Provisional application No. 61/059,162, filed on Jun. 5, 2008.

(51) Int. Cl.
*G06F 17/30* (2006.01)

(52) U.S. Cl.
CPC .... *G06F 17/30864* (2013.01); *G06F 17/30277* (2013.01)
USPC .......................................................... 707/763

(58) Field of Classification Search
None
See application file for complete search history.

(56) References Cited

U.S. PATENT DOCUMENTS

| | | | |
|---|---|---|---|
| 4,882,675 A | 11/1989 | Nichtberger et al. |
| 5,239,462 A | 8/1993 | Jones et al. |
| 5,339,392 A | 8/1994 | Risberg et al. |
| 5,729,693 A | 3/1998 | Holda-Fleck |
| 5,732,400 A | 3/1998 | Mandler et al. |
| 5,765,144 A | 6/1998 | Larche et al. |
| 5,797,133 A | 8/1998 | Jones et al. |
| 5,903,721 A | 5/1999 | Sixtus |
| 5,937,391 A | 8/1999 | Ikeda et al. |
| 5,940,811 A | 8/1999 | Norris |
| 5,943,424 A | 8/1999 | Berger |
| 5,963,915 A | 10/1999 | Kirsch |
| 5,984,180 A | 11/1999 | Albrecht |
| 6,009,412 A | 12/1999 | Storey |
| 6,014,645 A | 1/2000 | Cunningham |
| 6,029,149 A | 2/2000 | Dykstra et al. |
| 6,052,674 A | 4/2000 | Zervides et al. |

(Continued)

*Primary Examiner* — Sathyanarayan Pannala
(74) *Attorney, Agent, or Firm* — Garlick & Markison; Bruce E. Garlick (57) ABSTRACT

An Internet infrastructure supports searching of images by correlating a category selection with that of plurality of images hosted in Internet based servers in selected categories. An image search server supports delivery of search result pages to a client device based upon a search image or category selection, and contains images from a plurality of Internet based web hosting servers. The image search server delivers characteristic analysis of an image to the client device upon request. The selection of images is based upon: (i) word match, that is, by selecting images, titles of which correspond to the search image; and (ii) image correlation, that is, by selecting images, image characteristics of which correlates to that of category selection. The selection of images in the search result page also occurs on the basis of popularity. The category selection server also selects category based upon user's choice.

29 Claims, 7 Drawing Sheets

(56) References Cited

U.S. PATENT DOCUMENTS

| | | |
|---|---|---|
| 6,055,513 A | 4/2000 | Katz |
| 6,055,514 A | 4/2000 | Wren |
| 6,088,686 A | 7/2000 | Walker et al. |
| 6,141,006 A | 10/2000 | Knowlton et al. |
| 6,141,915 A | 11/2000 | Andersen et al. |
| 6,144,948 A | 11/2000 | Walker et al. |
| 6,167,385 A | 12/2000 | Hartley-Urquhart |
| 6,175,922 B1 | 1/2001 | Wang |
| 6,208,979 B1 | 3/2001 | Sinclair |
| 6,233,566 B1 | 5/2001 | Levine et al. |
| 6,236,975 B1 | 5/2001 | Boe et al. |
| 6,285,983 B1 | 9/2001 | Jenkins |
| 6,289,319 B1 | 9/2001 | Lockwood |
| 6,311,169 B2 | 10/2001 | Duhon |
| 6,324,521 B1 | 11/2001 | Shiota et al. |
| 6,324,524 B1 | 11/2001 | Lent et al. |
| 6,370,514 B1 | 4/2002 | Messner |
| 6,385,591 B1 | 5/2002 | Mankoff |
| 6,385,594 B1 | 5/2002 | Lebda et al. |
| 6,393,436 B1 | 5/2002 | Vaimberg-Araujo |
| 6,405,181 B2 | 6/2002 | Lent et al. |
| 6,405,281 B1 | 6/2002 | Akerib |
| 6,434,607 B1 | 8/2002 | Haverstock et al. |
| 6,453,306 B1 | 9/2002 | Quelene |
| 6,466,981 B1 | 10/2002 | Levy |
| 6,477,575 B1 | 11/2002 | Koeppel et al. |
| 6,477,580 B1 | 11/2002 | Bowman-Amuah |
| 6,484,149 B1 | 11/2002 | Jammes et al. |
| 6,505,773 B1 | 1/2003 | Palmer |
| 6,507,823 B1 | 1/2003 | Nel |
| 6,530,880 B2 | 3/2003 | Pagliuca |
| 6,567,791 B2 | 5/2003 | Lent et al. |
| 6,587,841 B1 | 7/2003 | DeFrancesco et al. |
| 6,594,640 B1 | 7/2003 | Postrel |
| 6,611,816 B2 | 8/2003 | Lebda et al. |
| 6,615,253 B1 | 9/2003 | Bowman-Amuah |
| 6,658,393 B1 | 12/2003 | Basch et al. |
| 6,684,196 B1 | 1/2004 | Mini et al. |
| 6,735,572 B2 | 5/2004 | Landesmann |
| 6,766,302 B2 | 7/2004 | Bach |
| 6,785,661 B1 | 8/2004 | Mandler et al. |
| 6,795,812 B1 | 9/2004 | Lent et al. |
| 6,847,942 B1 | 1/2005 | Land et al. |
| 6,868,395 B1 | 3/2005 | Szlam et al. |
| 6,895,388 B1 | 5/2005 | Smith |
| 6,898,570 B1 | 5/2005 | Tedesco et al. |
| 6,915,271 B1 | 7/2005 | Meyer et al. |
| 6,928,412 B2 | 8/2005 | DeBiasse |
| 6,934,692 B1 | 8/2005 | Duncan |
| 6,950,807 B2 | 9/2005 | Brock |
| 6,957,192 B1 | 10/2005 | Peth |
| 6,970,852 B1 | 11/2005 | Sendo et al. |
| 6,988,085 B2 | 1/2006 | Hedy |
| 7,010,508 B1 | 3/2006 | Lockwood |
| 7,013,289 B2 | 3/2006 | Horn et al. |
| 7,047,219 B1 | 5/2006 | Martin et al. |
| 7,069,234 B1 | 6/2006 | Cornelius et al. |
| 7,082,412 B1 | 7/2006 | Treider et al. |
| 7,096,354 B2 | 8/2006 | Wheeler et al. |
| 7,103,568 B1 | 9/2006 | Fusz et al. |
| 7,133,935 B2 | 11/2006 | Hedy |
| 7,143,063 B2 | 11/2006 | Lent et al. |
| 7,165,051 B2 | 1/2007 | Ronning et al. |
| 7,171,371 B2 | 1/2007 | Goldstein |
| 7,181,427 B1 | 2/2007 | DeFrancesco et al. |
| 7,194,436 B2 | 3/2007 | Tammaro |
| 7,219,080 B1 | 5/2007 | Wagoner et al. |
| 7,249,097 B2 | 7/2007 | Hutchison et al. |
| 7,289,964 B1 | 10/2007 | Bowman-Amuah |
| 7,310,617 B1 | 12/2007 | Cunningham |
| 7,353,192 B1 | 4/2008 | Ellis et al. |
| 7,363,267 B1 | 4/2008 | Vincent et al. |
| 7,376,603 B1 | 5/2008 | Mayr et al. |
| 7,395,259 B2 | 7/2008 | Bailey et al. |
| 7,428,045 B2 * | 9/2008 | Stewart et al. ............ 356/301 |
| 7,460,705 B2 * | 12/2008 | Nagahashi et al. ........ 382/165 |
| 7,505,939 B2 | 3/2009 | Lent et al. |
| 7,539,628 B2 | 5/2009 | Bennett et al. |
| 7,542,922 B2 | 6/2009 | Bennett et al. |
| 7,610,221 B2 | 10/2009 | Cella et al. |
| 7,627,531 B2 | 12/2009 | Breck et al. |
| 7,630,986 B1 | 12/2009 | Herz et al. |
| 7,657,126 B2 * | 2/2010 | Gokturk et al. ............ 382/305 |
| 7,660,751 B2 | 2/2010 | Cella et al. |
| 7,660,752 B2 | 2/2010 | Cella et al. |
| 7,729,959 B1 | 6/2010 | Wells et al. |
| 7,742,966 B2 | 6/2010 | Erlanger |
| 7,769,681 B2 | 8/2010 | Misraje et al. |
| 7,908,226 B2 | 3/2011 | Hutchison et al. |
| 7,938,316 B2 | 5/2011 | Bennett et al. |
| 7,942,316 B2 | 5/2011 | Bennett et al. |
| 8,036,941 B2 | 10/2011 | Bennett et al. |
| 8,117,120 B2 | 2/2012 | Misraje et al. |
| 8,121,860 B2 * | 2/2012 | Haskell et al. ................. 705/2 |
| 8,145,563 B2 | 3/2012 | Misraje et al. |
| 8,177,124 B2 | 5/2012 | Bennett et al. |
| 8,180,788 B2 * | 5/2012 | Bennett ...................... 707/763 |
| 8,181,851 B2 | 5/2012 | Bennett et al. |
| 8,478,767 B2 * | 7/2013 | Kern et al. ................. 707/756 |
| 2002/0035753 A1 * | 3/2002 | Jakubowski et al. .......... 5/658 |
| 2002/0052778 A1 | 5/2002 | Murphy et al. |
| 2008/0162437 A1 * | 7/2008 | Choi et al. ...................... 707/3 |
| 2008/0226119 A1 * | 9/2008 | Candelore et al. .......... 382/100 |

* cited by examiner

FIG. 6 and/or correlated with titles of images in the database. In other words, the image search server identifies relevant images in the image database that correlate with the search image and delivers a search result containing a list of relevant images.

SEARCH SYSTEM EMPLOYING MULTIPLE IMAGE BASED SEARCH PROCESSING APPROACHES

CROSS REFERENCE TO PRIORITY APPLICATIONS

The present U.S. Utility patent application is a continuation of U.S. Utility patent application Ser. No. 13/481,996, filed May 29, 2012, which is a continuation of U.S. Utility application Ser. No. 12/185,796, filed Aug. 4, 2008, now issued as U.S. Pat. No. 8,190,623, which claims priority pursuant to 35 U.S.C. §119(e) to U.S. Provisional Application Ser. No. 61/059,162, filed Jun. 5, 2008, all of which are hereby incorporated herein by reference in their entirety and made part of the present U.S. Utility patent application for all purposes.

CROSS REFERENCE TO RELATED APPLICATION

The present application is related to U.S. Utility application Ser. No. 12/185,804 filed Aug. 4, 2008, now issued as U.S. Pat. No. 8,180,788, and entitled "IMAGE SEARCH ENGINE EMPLOYING IMAGE CORRELATION,", which is incorporated herein in its entirety by reference for all purposes.

BACKGROUND

1. Technical Field

The present invention relates generally to Internet infrastructures; and, more particularly, to search engines.

2. Related Art

Image search engines are used everywhere to search for images that are available in the hosted web pages and image databases. Users may search for images with a wide variety of interests such as business, engineering and scientific research as well as home based general interests. Search engines usually select images to be displayed as search result based upon a search keyword (or, search string) and popularity of the images. A plurality of images are displayed in each search result page with a 'next' and 'previous' buttons to guide the user to subsequent and previous search result pages, that contain more images.

Users often look for images, having certain type of images in mind such as cartoon, portrait, landscape, graphics, scientific and architecture images. Often, these searches result do not meet user's expectations, because the search engines attempt to match words in the title of the images with that of search string. This results in wide variety of images being displayed, many of them being totally unrelated to the user's subject of interest. In addition, many images contain adult content which are not desirable in many instances, such as when children searching for images or when searching in front of an audience.

For example, a user may enter 'children art' as the image search string, desiring to find hand drawn images made by children of specific kind and may receive a long list of images of variety of images, page after page. Images may contain cartoons, pictures taken by children, some hand drawn images, pictures of children drawing images etc. These form wide variety of subjects, very few of which are relevant to the user's search. Not getting desired results in the initial page, the user may step through several screens via the 'next' button. This again results in many of the same kind of images that were previously unhelpful.

These and other limitations and deficiencies associated with the related art may be more fully appreciated by those skilled in the art after comparing such related art with various aspects of the present invention as set forth herein with reference to the figures.

DETAILED DESCRIPTION OF THE DRAWINGS

Figure 1:
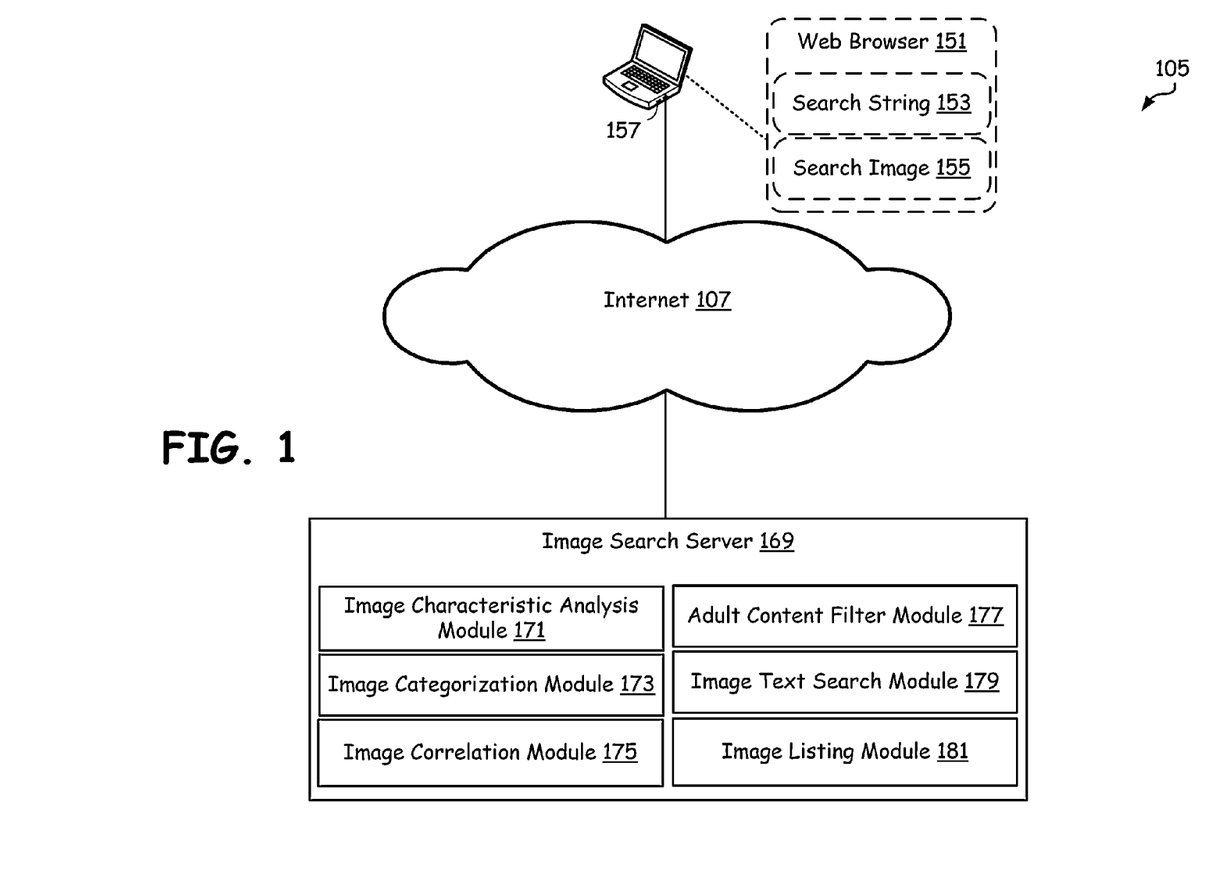
FIG. 1 is a schematic block diagram illustrating an Internet infrastructure containing a client device and web browser accessible image search server, wherein the image search server delivers one or more images by using one or more of characteristic analysis, categorization and/or correlation.

FIG. 1 is a schematic block diagram illustrating an Internet infrastructure 105 containing a client device 157 and a web browser accessible image search server 169, wherein the image search server 169 delivers one or more images by using one or more of characteristic analysis, categorization and/or correlation. Specifically, in a representative embodiment, the image search server 169, upon receipt of a search image 155 from web browser 151 of the client device 157, performs characteristic analysis of the search image 155, categorizes the search image 155 into one of the plurality of image categories, searches for images in image database that correlate closely with the search image 155 (within in the determined category) and delivers search result pages containing images to the client device. In addition, the image search server 169 may also deliver characteristic parameters obtained during characteristic analysis to the web browser 151 of the client device 157, upon request.

The image search server 169 may also receive a search string 153, upon which the image search server 169 matches the word or words in the search string 153 with that or those of titles in plurality of images in the database. Thus, the image search server 169 delivers images to the web browser 151 of the client device 157 based upon search string 153 and search image 155, constructing one or more search result pages and delivering one search result page at a time. The search image 155 may be submitted to the image search server 169, from the client device's 157 web browser 151, by uploading the image in an image search server's (search engine's) web page, detailed description of which is provided with reference to the description of snap shot in FIG. 6, for example.

The image search server 169 identifies characteristic parameters of the search image 155 received from the client device's 157 web browser 151, within the category selected by the user or automatically determined by the image search server 169. The category or categories related to the search image 155, if not received from the user of the client device 157, may be automatically determined by the image search server 169, by determining one or more characteristic parameters. The chosen category and characteristic parameter(s) may be delivered to the web browser 151 of the client device upon request from the user. Then, the image search server 169 correlates these characteristic parameter(s) with that or those of a plurality of images in the image database, within the category selected or automatically determined by the image search server 169. The image search server 169 then selects and prioritizes images based upon closeness in correlation to that of the search image 155 and on popularity basis. If the user chooses to search in all categories, then the image search server 169 skips categorization of the search image 155.

In addition, the image search server 169 also matches word(s) in the search string 153 with that or those of titles of the plurality of images in the image database 181 and selects a plurality of images, sorts them on the basis of closeness in match and popularity, and delivers them to the web browser 151 of the client device 157. In all, the image search server 169, in a single page of image search results, may deliver: (i) images sorted on the basis of close correlation, within one or more of categories; (ii) images sorted on the basis of both close correlation and popularity, within one or more of categories; (iii) images sorted on the basis of close matches between the word(s) of the search string 153 and that or those of titles of images in the image database, within one or more categories; and (iv) images sorted on the basis of both close match and popularity, within one or more categories. The user may select: (i) one or more categories mentioned above; or (ii) may deselect any of the categories, allowing the image search server to determine the category; or (ii) may select all of the categories, thus, switching off the function of categorizing. In addition, the image search server 169 performs for adult content filtering based upon user settings in the client device's 157 web browser 151. Detailed description of a typical search result page is provided with reference to the description of web page snap shot in FIG. 7, for example.

The image search server 169 contains an image characteristic analysis module 171 that analyzes the images and determines characteristic parameters of the images. The images in the image database are obtained from a plurality of web hosting servers by crawling through them, or by submission from users. During crawling, for example, the image characteristic analysis module 171 determines characteristic parameter(s) of each of the images it comes across in various web hosting servers. These characteristic parameter(s) are stored in the image database along with the image, web links associated with the images, among other information.

The image search server 169 also contains an image categorization module 173 that determines the category of the images obtained during crawling, among a plurality of predetermined categories, based upon the characteristic parameter(s). This information of category is stored in the image database along with other information such as characteristic parameter(s), web links associated with images and image titles.

When a search image 155 is received from the web browser 151 of the client device 157, the image characteristic analysis module 171 determines the characteristic parameter(s). This information is delivered to the web browser 151 if user requests for such information. The characteristic parameter(s) related information may be tabled before delivery or alternatively, may be shown graphically, depicted on the search image itself. Upon delivery of a first search result page, for example, the user may select any of the images displayed and request for characteristic analysis. In such a case, the image characteristic analysis module 171 delivers characteristic parameter(s) of the image selected, tabled or graphically.

Once characteristic parameter(s) of the search image 155 are determined, the image categorization module 173 determines the category of the search image 155. Alternatively, the user may also select one or more categories within which the search is intended. In this case, the image categorization module 173 may skip determining the search image 155 category. In addition, the image search server 169 contains an image correlation module 173 that correlates characteristic parameter(s) of search image 155 with that of the plurality of images in the image database. The correlated images in the image database are then sorted on the basis of closeness in correlation and are tabled along with other image related information such as characteristic parameter(s), category, image titles and web links, where they were originally located. Another table may also contain, within the category, images sorted on the basis of popularity. These sorted images are filtered by an adult content filter module 177, by using digital image correlation. For digital image correlation, the adult content filter module 177 may use sample images with adult content.

An image text search module 179 correlates word(s) in the search string 153 and those of titles of the plurality of images in the image database. The correlated images may be sorted on the basis of closeness in correlation along with image titles and on web links where they are originally located. In another table the closely correlated images may again be sorted on the basis of popularity. These sorted images may also be filtered by the adult content filter module 177.

Based upon the sorting of images and the filtering, in a representative embodiment, four basic tables are formed: (i) sorted on the basis of closeness in correlation to the search image 155, within the category selection; (ii) sorted on the basis of popularity within the first few closely correlated images in (i); (iii) sorted on the basis of closeness in match, within the category selection; and (iv) sorted on the basis of popularity in (iii). Finally, an image listing module 181 lists the images from the four tables (i) through (iv) to form a plurality of search result pages, each containing a certain portion of each of the tables (i) through (iv). This listing may be done in a mutually exclusive manner so that none of the images in any of the search result pages is repeated. In case of selection of plurality of categories, some images from each of these categories are selected, for each search result page. Then, the image search server 169 delivers a first of these search result pages containing a first few search results thus constructed.

The search result pages delivered contain a series of images from the four sorted tables, and in addition taken from one or more user selected or automatically generated categories. The search result page also contains 'upload image', 'characteristic analysis', 'prev' and 'next' buttons to upload search image 155, analyze search image 155 or a selected image from the images displayed, access prior displayed search result pages and the subsequent search result pages, respectively.

In addition, the search result page also contains provision for user category selection. The category selection provision may allow a user to select some of a plurality of options such as 'Let SE (Search Engine) Determine', 'All Categories', 'Cartoon', 'Portrait', 'Landscape', 'Graphics' and 'Architecture'. 'Let SE (Search Engine) Determine' option allows the image search server to determine one or more categories automatically based upon characteristic parameter(s) of the search image 155. A first search engine web page also contains an image window where uploaded image appears, before search process begins.

Figure 6:
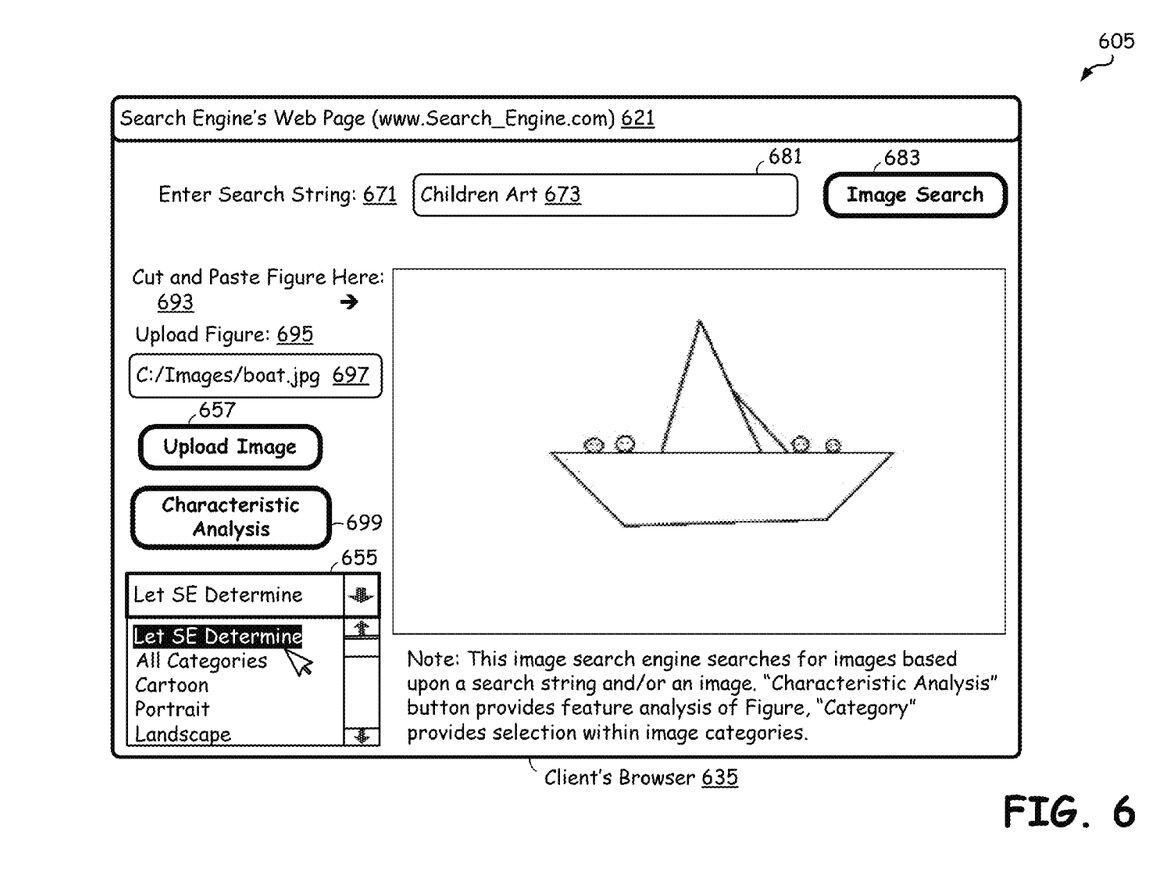
FIG. 6 is an exemplary schematic diagram illustrating snap shot of search interface web page of the image search server of FIG. 1.
Figure 7:
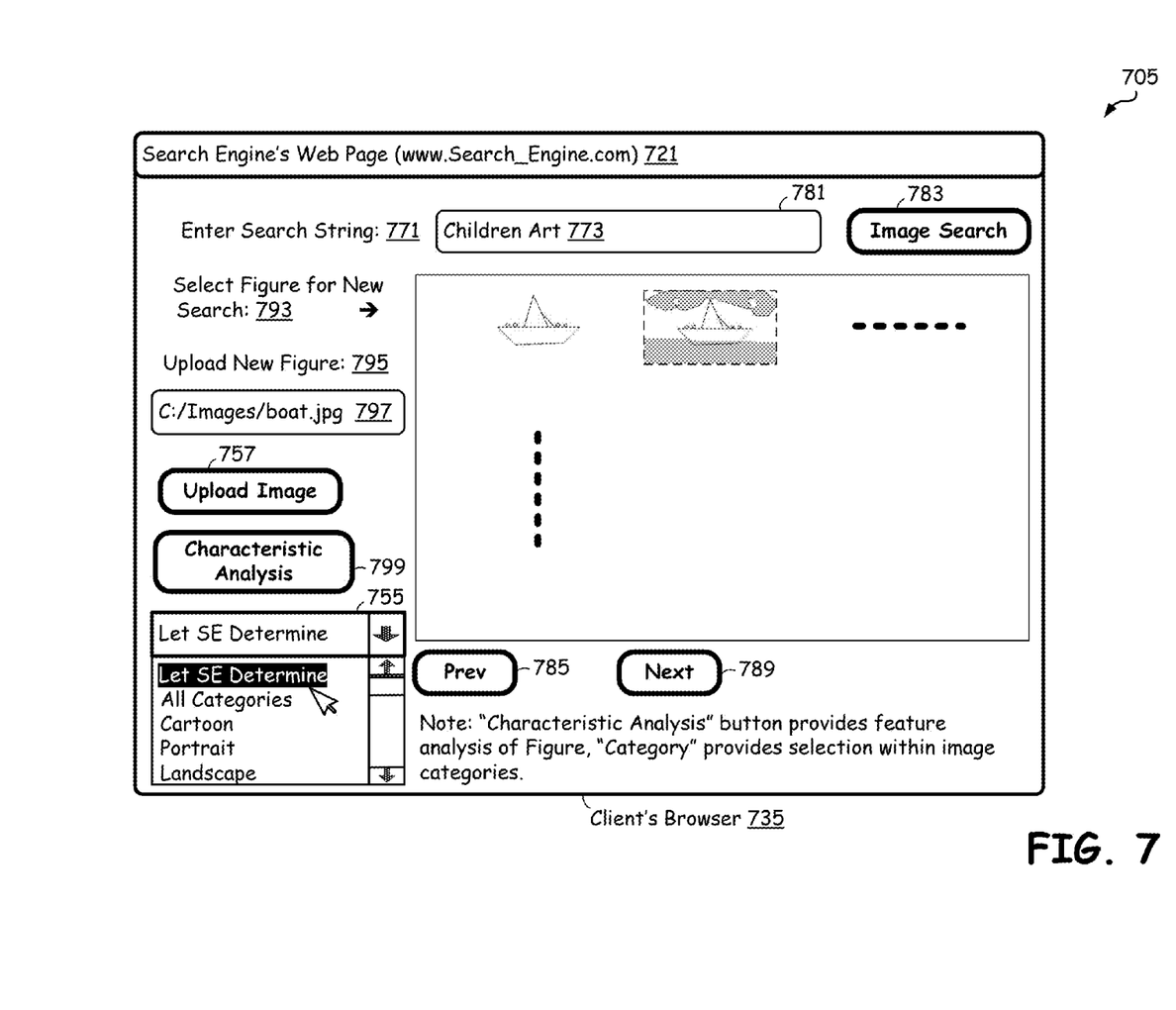
FIG. 7 is an exemplary schematic diagram illustrating snap shot of a first image search result page based upon a search string and a search image.

For example, a user may provide a search string 153 'children art' and a hand drawn search image 155 of a boat (refer to the FIGS. 6 and 7). The user may have uploaded the search image 155 intending to find more of such hand drawn images by other children. Upon clicking the 'characteristic analysis' button, the image characteristic analysis module 171 delivers image characteristic parameter(s) (in a pop up window, or the image window itself) either in a table format or graphically with numbers displayed along with the image (in this case, the search image of the boat). The image categorization module 173 may also display the category or categories determined automatically, along with the characteristic parameter display. This enables user to select categories of interest, for example.

Then, upon clicking 'image search' button, the image characteristic analysis module 171 begins processing the image of the boat by extracting characteristic parameter(s) of the image such as, for example and without limitation, pixels, colors of the pixels, strength of the pixels and position of the pixels. In addition, the image categorization module 173 determines the category or categories within which to perform search, either by receiving the category or categories from the user or automatically determining it/them. Next, the image correlation module 175 correlates the characteristic parameter(s) of the image with the characteristic parameter(s) of images in the image database. Closely correlated images resemble the search image 155 of the boat closely, thus extracting images that are most similar to the user uploaded search image 155. Then, a table of images is formed that is sorted on the basis of closeness of the images in the image database, thus the first image resembling closest to that of the hand drawn boat image. In addition, in another table, images that closely correlate with the search image 155 of the boat are again sorted on the basis of popularity. These sorted images may also be filtered by an adult content filter module 177. In addition, the image text search module 179 correlates the words of search string 'children art' with the words of the titles of the plurality of images in the image database and forms a table of images that is sorted using closeness in correlation. In another table, images that closely correlate may again be sorted on the basis of popularity. These sorted images may also be filtered by the adult content filter module 177.

Finally, the image listing module 181 lists the images from the four tables to form a plurality of search result pages. Then, the image search server 169 delivers a first of these search result pages containing a first few search results of each of the tables. The first search result page may contain, for example, a set of 16 images; four in each row. The first row may contain images that closely correlate to that of image of the beach house from one or more categories, the second row may contain the ones that are sorted on the basis of popularity, the third row may contain images, words in the titles of which closely match to the words 'children art', from one or more categories and the fourth row may contain images with titles that closely match to the words 'children art' and are sorted on the basis of popularity.

Figure 2:
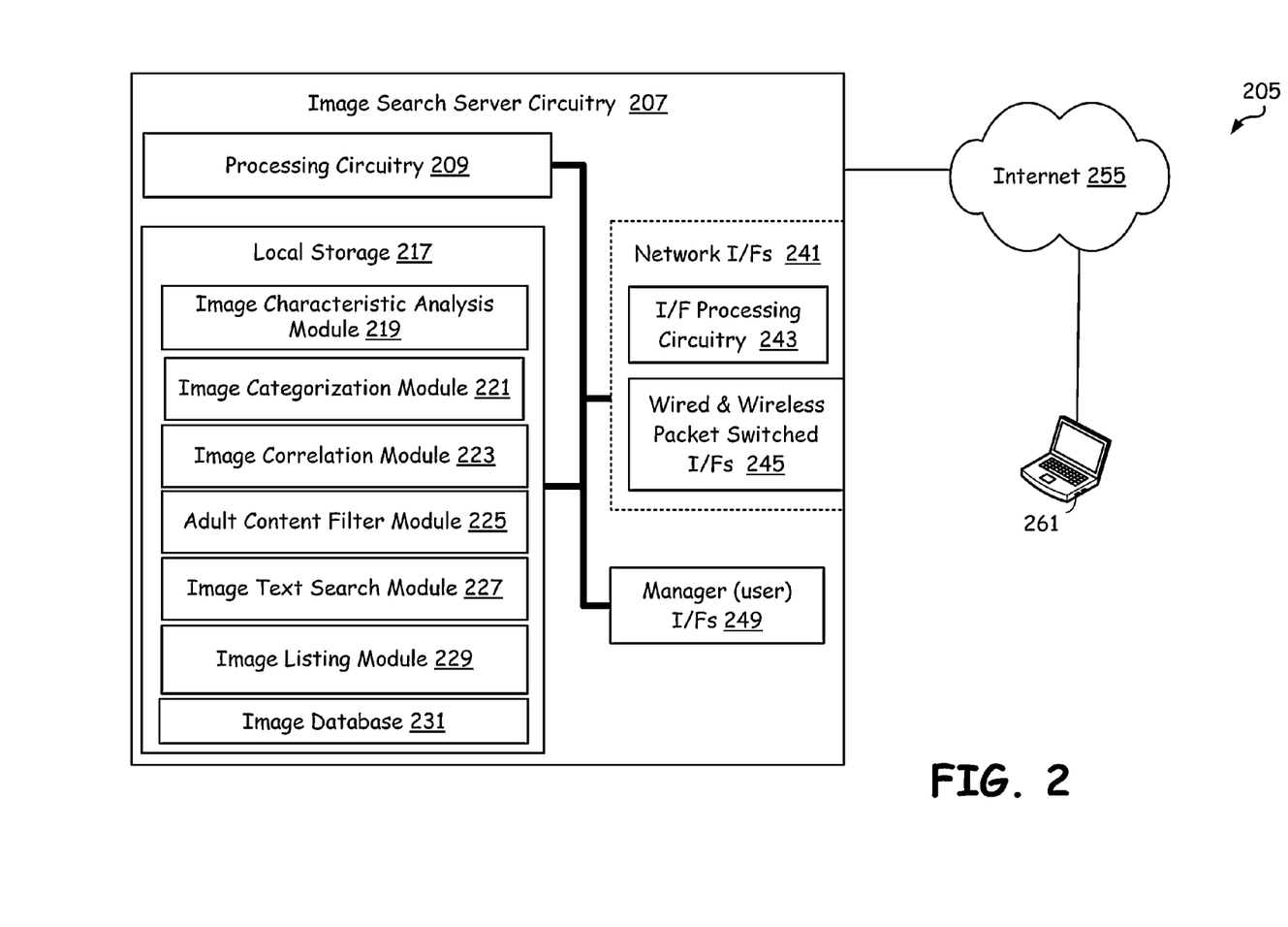
FIG. 2 is a schematic block diagram illustrating exemplary components of the image search server constructed in accordance with the embodiment of FIG. 1 of the present invention.

FIG. 2 is a schematic block diagram illustrating exemplary components of the image search server 207 constructed in accordance with the embodiment of FIG. 1 of the present invention. The image search server circuitry 207 may, in whole or in part, be incorporated into any computing device that is capable of serving as an Internet based server. The image search server circuitry 207 generally includes processing circuitry 209, local storage 217, manager interfaces 249 and network interfaces 241. These components are communicatively coupled to one another via one or more of a system bus, dedicated communication pathways, or other direct or indirect communication pathways. The processing circuitry 209 may be, in various embodiments, a microprocessor, a digital signal processor, a state machine, an application specific integrated circuit, a field programming gate array, or other processing circuitry.

The network interfaces 241 contain wired and wireless packet switched interfaces 245 and may also contain built-in or an independent interface processing circuitry 243. The network interfaces 241 allow the image search server 207 to communicate with client devices such as 261 and to deliver search result pages of images. The manager interfaces 249 may include a display and keypad interfaces. These manager interfaces 249 allow the user at the image search server 207 to control aspects of the present invention. The client device 261 illustrated are communicatively coupled to the image search server 207 via an Internet 255.

Local storage 217 may be random access memory, read-only memory, flash memory, a disk drive, an optical drive, or another type of memory that is operable to store computer instructions and data. The local storage 217 includes an image characteristic analysis module 219, image categorization module 221, image correlation module 223, adult content filter module 225, image text search module 227, image listing module 229 and image database 231 to facilitate user's image search, in accordance with the present invention.

The image characteristic analysis module 219 analyzes the images and determines characteristic parameter(s) of the images that are obtained from a plurality of web hosting servers by crawling through them, by submission from users or when received from the client device 261 as a search criterion. The characteristic parameter(s) thus determined are stored in the image database 231 along with the image, web links associated with the images, among other information. The image categorization module 221 determines the category of the images received, among many predetermined categories, based upon the characteristic parameter(s). This information of category is stored in the image database 231 along with other information such as characteristic parameter(s), web links associated with images and image titles.

For example, when the search image is received from the client device 261, the image characteristic analysis module 219 determines the characteristic parameter(s). This information is delivered to the client device 261 if requested. Once characteristic parameter(s) of the search image are determined, the image categorization module 221 determines the category or categories of the search image. Alternatively, the user may also select one or more categories within which the search is intended. In this case, the image categorization module 219 skips determining the search image category or categories.

The image correlation module 223 performs correlation processing between the determined characteristic parameter(s) of the search image and that of the plurality of images in the image database 231. The correlated images in the image database 231 are then sorted on the basis of closeness in correlation and are tabled along with other image related information such as characteristic parameter(s), category, image titles and web links. The image correlation module 223 also forms another table that contains, within the categories selected or chosen, images sorted on the basis of popularity. These sorted images may also be filtered by the adult content filter module 225.

The image text search module 227 matches word(s) in the search string with that or those of titles of the plurality of images in the image database 231 and forms a table containing images, image titles and web links. Then, the image text search module 227 sorts the table on the basis of closeness in match. In addition, in another table, the image text search module 227 sorts the images on the basis of popularity. These sorted images may also be filtered by the adult content filter module 225, by using word matching techniques.

Based upon the sorting of images and the filtering, by the image correlation module 223 and image text search module 227, in a representative embodiment, four basic tables are formed. Each of these tables may contain images from one or more user chosen or automatically selected categories. Finally, the image listing module 229 lists the images from the four basic tables to form a plurality of search result pages, each containing a certain portion of each of the four basic tables, in a mutually exclusive manner so that none of the images in any of the search result pages is repeated.

In other embodiments, the image search server 207 of the present invention may include fewer or more components than are illustrated as well as lesser or further functionality. In other words, the illustrated image search server is meant to merely offer one example of possible functionality and construction in accordance with the present invention.

Figure 3:
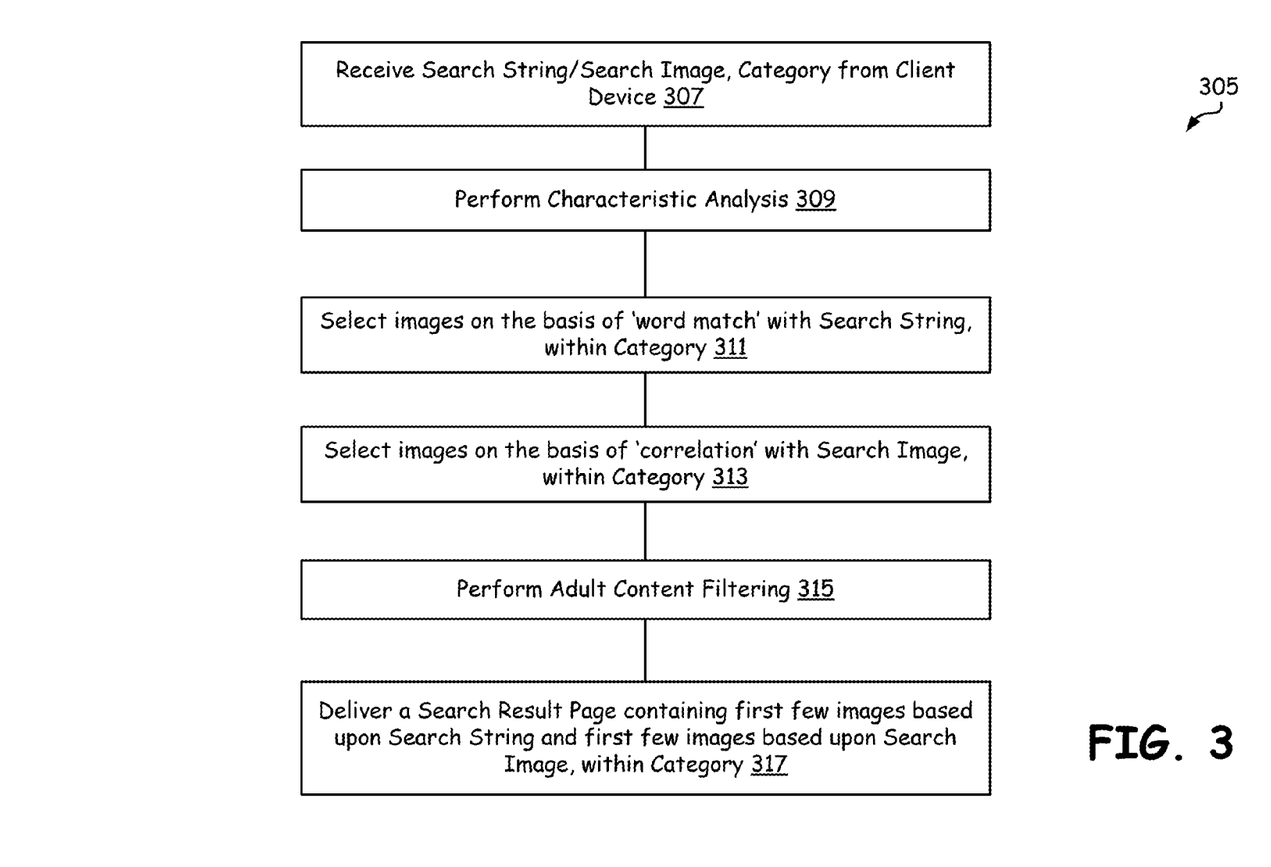
FIG. 3 is a flow diagram illustrating exemplary functionality of the image search server of FIG. 1.

FIG. 3 is a flow diagram illustrating exemplary functionality of the image search server of FIG. 1. The functionality begins at a block 307 when the image search server receives a search string and/or a search image, and a chosen category or chosen categories (if any) from the client device. Then, at a next block 309, the image search server performs characteristic analysis and determines the characteristic parameter(s). This information is delivered to the client device if requested. Once characteristic parameter(s) of the search image are determined, the image search server determines the categories related to the search image, if one or more categories within which the search is intended are not selected by the user.

At a next block 311, the image search server matches a word or words in the search string with that or those of titles of a plurality of images in the database and selects images. The process of selecting images involves word matching between the search string and the titles of the images in the database. Then, the process involves generating a table containing columns of image titles and web links associated with the images that are sorted on the basis of closeness in match. The image search server also creates another table that is sorted on the basis of popularity.

At a next block 313, the image search server performs correlation processing between the determined characteristic parameter(s) of the search image and that of the plurality of images in the image database and selects images. The process of selecting images involves sorting correlated images on the basis of closeness in correlation and forming a table containing image related information such as, for example, characteristic parameter(s), category, image titles and web links. The image search server also forms another table that contains, within the category or categories selected or chosen, images sorted on the basis of popularity.

Then, at a next block 315, the image search server filters images with adult content from the images selected using search strings and/or search images with adult content. Then, the image search server lists the images selected from the two tables using search string and two tables using search image to form a plurality of search result pages, each containing a certain portion of each table. At a final block 317, the image search server delivers a first search result page containing a first few of the selected, sorted and filtered images using the search string, and a first few selected, sorted and filtered images using the search image, within one or more chosen or automatically determined categories.

Figure 4:
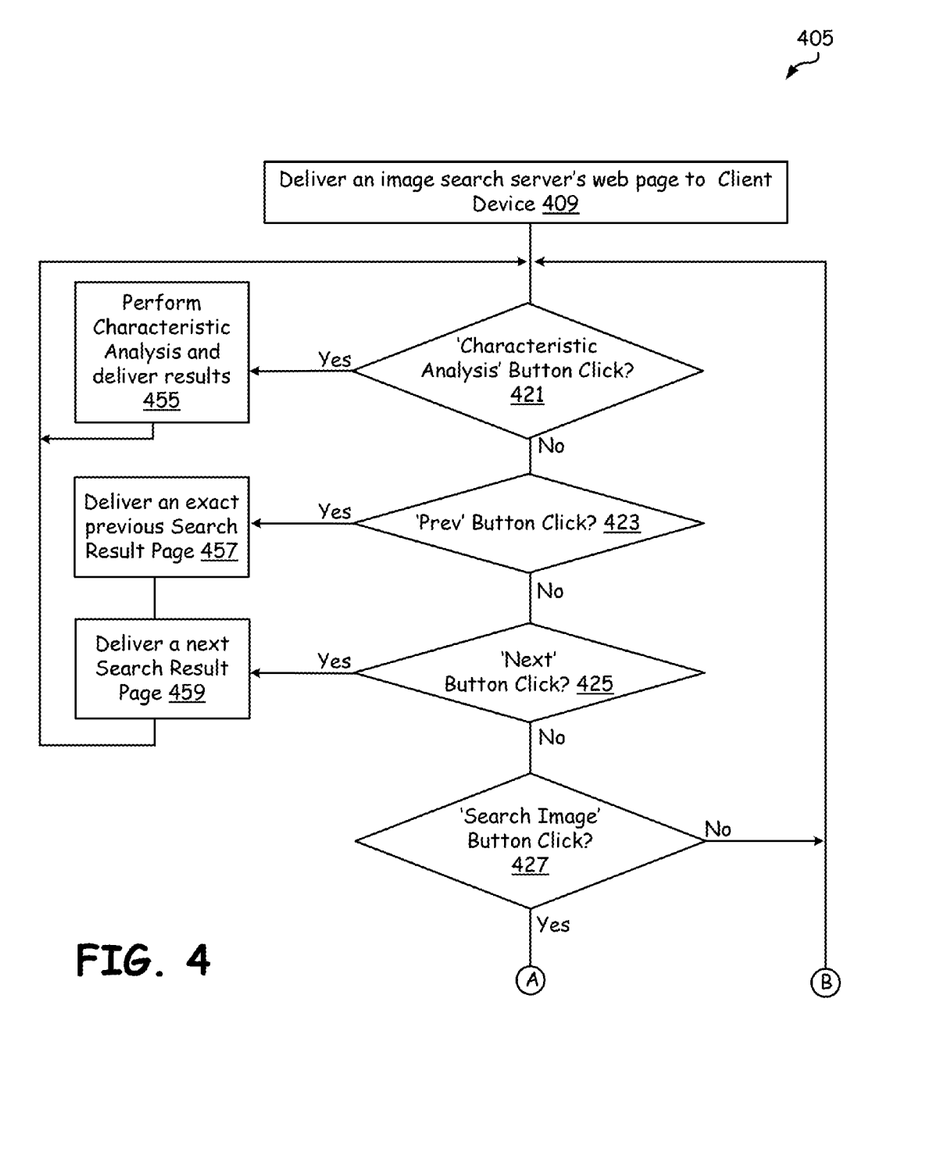
FIG. 4 is a flow diagram illustrating exemplary functionality of the image search server of FIG. 1 upon delivering an image search server's web page, in accordance with the present invention.

FIG. 4 is a flow diagram illustrating exemplary functionality of the image search server of FIG. 1 upon delivering an image search server's web page, in accordance with the present invention. The functionality begins at a block 409 when the image search server's web page is delivered to the web browser of the client device upon request. The web page may be the image search server's first web page that initiates a new search session via a new search string and/or new search image or subsequent search result pages of images. The first web page typically contains provisions to enter a search string, search image as well as buttons that facilitate characteristic analysis ('characteristic analysis' button), image search ('image search' button), viewing of a subsequent search result page ('next' button) and viewing of a previous search result page ('prev' button). Similarly, the subsequent search result pages of images contain provisions to enter new search string, select a displayed image as a new search image, upload a new search image, analyze a selected image (by selecting a image and clicking on 'characteristic analysis' button) as well as 'image search' button, 'next' button and 'prev' button.

Then, at a next decision block 421, the image search server determines if 'characteristic analysis' button is clicked by the user in the delivered image search server's web page. If yes, at a next block 455, the image search server performs characteristic analysis and delivers the results to the web browser. The image characteristic parameter(s) may be delivered in a pop up window or the image window itself, either in a table format or graphically with numbers displayed along with the image. After delivering image characteristic parameter(s) at the block 455, the image search server waits for new inputs from the user of the client device.

If 'characteristic analysis' button is not clicked at the decision block 421, then, at a next decision block 423, the image search server determines if 'prev' button is clicked. If yes, at a next block 457, the images search server delivers an exact previous search result page and waits for new inputs from the user of the client device. In case of the image search server's first web page, the 'prev' button is disabled since no previous pages are available. If 'prev' button is not clicked at the decision block 423, then, at a next decision block 425, the image search server determines if 'next' button is clicked. If yes, at a next block 459, the images search server delivers a subsequent search result page and waits for new inputs from the user of the client device.

If 'next' button is not clicked at the decision block 425, then, at a next decision block 427, the image search server determines if 'search image' button is clicked. If not, the image search server waits for new inputs from the user of the client device. If yes at the decision block 427, then the image server begins processing of a new search criteria, based upon a search string and/or search image at 'A' (refer to the FIG. 5 for continuation).

Figure 5:
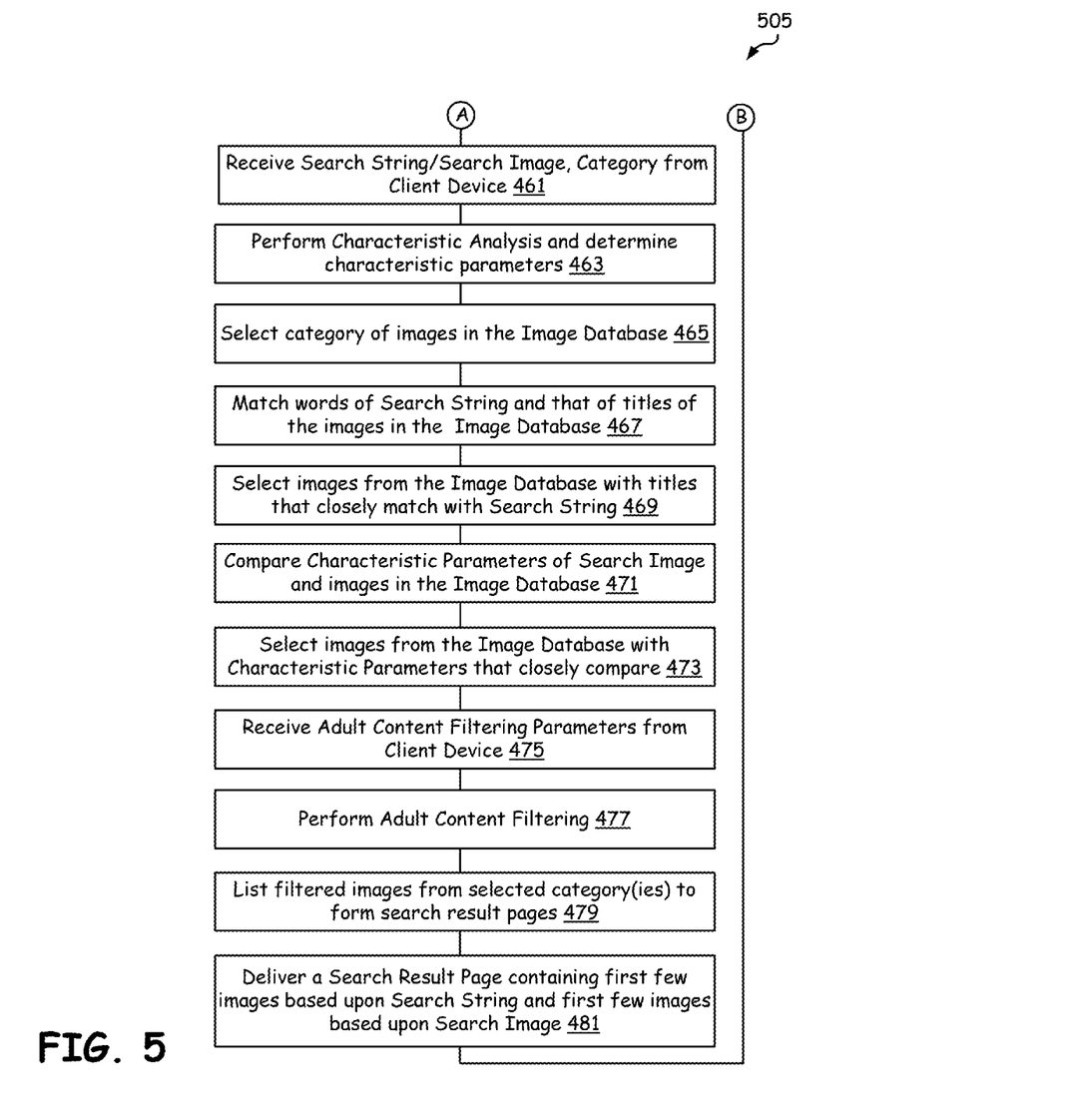
FIG. 5 is a flow diagram illustrating exemplary functionality of the image search server of FIG. 1, continued from FIG. 4.

FIG. 5 is a flow diagram illustrating exemplary functionality of the image search server of FIG. 1, continued from FIG. 4. The processing of a new search criteria starts at 'A', when at a block 461, the image search server receives a search string and/or search image, and a selected category or selected categories, if any, from the client device. At a next block 463, the image search server performs characteristic analysis and determines the characteristic parameter(s) of the search image. If categories are selected by the user, at a next block 465, the image search server selects (retrieves) images that belong to the selected category or categories (if any) for further processing. If one or more of categories are not selected by the user and if the user decides that let the image search server do it, then the image search server selects one or more categories based upon the characteristic parameter(s) of the search image.

Then, at a next block 467, the image search server matches words of search string with that of titles of images in the database. At a next block 469, the image search server selects images from the image database that closely match (for example, above predetermined threshold). The process of selecting images starts when the matched images in the image database are sorted on the basis of closeness in match to generate a table containing columns of images titles, web links associated with the images and closeness in match. The image search server also creates another table that contains images titles, web links associated with the images and closeness in match that is sorted on the basis of popularity.

At a next block 471, the image search server correlates characteristic parameter(s) of the search image with that of the plurality of images in the database. Then, at a next block 473, the image search server selects images from the image database that closely correlate (for example, above a predetermined threshold). The image selection process using the search image involves creating a table containing image titles, associated web links and closeness in correlation among other columns, and then sorting the table on the basis of closeness in correlation. In another table, the image search server sorts the first few images that closely correlate on the basis of popularity. Thus, in a representative embodiment, the image search server creates two or four tables, depending upon the availability of the search string or search image.

Then, at a next block 475, the image search server receives one or more adult content filtering parameters from the client device. The adult content filtering parameter(s) may be received when a search process is initiated or any time after that. At a next block 477, the image search server performs filtering of images that are sorted in the two or four tables with adult content from the images selected using search strings and/or search images with adult content.

At a next block 479, the image search server lists and generates a single table containing images to form a plurality of search result pages, from the two tables based upon the search string and two tables based upon the search image. The image search server generates this listing in a mutually exclusive manner so that none of the images in any of the search result pages is repeated. At a final block 481, the image search server delivers a search result page containing first few images based upon the search string and first few images based upon the search image. Then, the image search server waits for user response, at 'B' (refer to FIG. 4). This process continues until the user abandons the search.

FIG. 6 is an exemplary schematic diagram illustrating a snap shot of search interface web page of the image search server of FIG. 1. Specifically, the exemplary snap shot illustrated shows an image search server's first web page delivered to a web browser 635 of the client device to facilitate a user's image search. The image search server's first web page may contain a page title such as 'Search Engine's web page (www.Search_Engine.com)' 621, and the 'image search' 683 and 'characteristic analysis' 699 buttons.

In addition, text such as 'Enter Search String:' 671 and text box 681 are provided to facilitate user's search. An additional image window is provided for the user to cut and paste or upload search image. Text such as 'Cut and Paste Figure Here:' 693 and 'Upload Figure:' 695 is provided to facilitate user's image search. Helpful note text informs the user about the functioning of the image search engine of the present invention, such as 'Note: This image search engine searches for images based upon a search string and/or search image. "Characteristic Analysis" button provides feature analysis of the Figure, "Category" provides selection within image categories.' may be provided with the image search server's first web page.

The user may enter the search string in the text box 681, such as 'Children Art' 673. The user may search on the basis of the search string alone. The image search server (169 of FIG. 1) provides images, in this case, based upon match in the words of the search string (Children and Art, in this illustration) with those of titles of the images that are stored in the image database. In addition, the user may provide a search image. This may be done by cutting from some other image tool (painting or image software, for example) and pasting it on to the window provided in the search engine's web page. Alternatively, the user may upload the image to the image window using the upload text box and by providing the address of the image file in the client device ('C:/Images/boat.jpg' 697, in the illustration). The uploaded image appears in the image window once 'upload image' button 657 is clicked.

In addition, the image search server's first web page also contains provision for user category selection 655. The category selection provision allows a user to select some of plurality of options such as 'Let SE (Search Engine) Determine', 'All Categories', 'Cartoon', 'Portrait', 'Landscape', 'Graphics' and 'Architecture'. The 'Let SE (Search Engine) Determine' option allows the image search server to determine one or more categories automatically based upon characteristic parameters of the search image. The 'All Categories' selection allows the image search server to search from all of the images in the database. Other selections allow image searches that are specific to the selected category. Though the illustration shows single selections, in other embodiments, it is possible to select multiple categories. The 'characteristic analysis' button allows user to view the characteristic parameters of the image in the image window, either in the form of a table or graphically. Once either or both of the search string 673 and search image are provided to the web page, the user may click on 'image search' button 683. The web browser 635 sends the search string 673 and/or search image to the image search server for further processing.

FIG. 7 is an exemplary schematic diagram illustrating snap shot of a first image search result page based upon a search string and a search image. Specifically, the exemplary snap shot illustrated shows a first search result page 705 delivered to web browser 735 of the client device, containing selected searched images, on the basis of a search string/search image. The first search result page delivered may contain a page title such as 'Search Engine's Search Result Page (www.Search_Engine.com)' 721.

A text such as 'Enter Search String:' 771 and text box 781 are provided to facilitate user's further search. An additional image window shows searched images, which are selectable for further search. That is, the image window contains a series of images delivered by the image search server (169 of FIG. 1). For example, the image window illustrated may contain a set of 16 images; in four rows and four columns. Each of the four rows may, for example, contain: (i) images sorted on the basis of closeness in correlation to the search image, within the selected categories; (ii) images sorted on the basis of popularity within the first few closely correlated images in (i), within the selected category or categories; (iii) images sorted on the basis of closeness in match between the word(s) in the titles of the plurality of images, in the image database, to that or those of a search string, within the selected category or categories; and (iv) images sorted on the basis of popularity within the first few closely matched images in (iii), within the selected category or categories, respectively. The images in the image window may also have different portions of one of the four possibilities mentioned above, in other embodiments.

The image window facilitates the ability of a user to select any of the displayed images for further search. The illustration shows a second image being selected. Once selected, the user may click on the 'image search' button 783 to initiate a new search based upon a selected search image and entered search string in the text box 781. Similarly, the user may click on 'characteristic analysis' button 799 to view the characteristic parameter(s) of the image selected. The illustration shows a search string in the text box 781 as 'Children Art' 773, selected image as a second one in the first row. Alternatively, the user may upload a new image to the image window using the upload text box 797, and by providing the address of the image in the client device ('C:/Images/boat.jpg' 797, in the illustration). The uploaded image appears in the image window once an 'upload image' button 757 is clicked. Text such as 'Select Figure for a New Search:' 793 and 'Upload New Figure:' 795 are provided to guide the user toward a new search.

The first search result page also contains provision for user category selection 755, if a new search is to be initiated (based upon a selected image). The category selection provision allows user to select some of plurality of options such as 'Let SE (Search Engine) Determine', 'All Categories', 'Cartoon', 'Portrait', 'Landscape', 'Graphics' and 'Architecture'. Though the illustration shows single selections, in another embodiment, it is possible to select multiple categories. The search result page also contains the 'prev' 785 and 'next' 789 buttons to access prior displayed search result pages and the subsequent search result pages, respectively. By clicking on the title or double clicking on the image, the user may be able watch the corresponding image in its original size in a pop-up window. Helpful note text informs the user about the functioning of the image search engine of the present invention, such as 'Note: "Characteristic Analysis" button provides feature analysis of the Figure, "Category" provides selection within image categories.' may also be provided.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. An online search system that services both a plurality of web hosting servers and a plurality of user computing devices via an Internet, the online search system comprising:
 a processing infrastructure that crawls each of the plurality of web hosting servers to gather a plurality of images, the first processing infrastructure associates at least one of a plurality of image characteristic with each of the plurality of images;
 a communication interface through which a user interface setting and an uploaded search image are received by the processing infrastructure, the user interface setting identifying one of a first setting and a second setting; and
 the processing infrastructure being operable to respond to the first setting identified via the user interface setting by attempting to match the uploaded search image with each of the plurality of images, and the processing infrastructure being operable to respond to the second setting identified via the user interface setting by (i) analyzing the uploaded search image to identify at least one image characteristic, and (ii) attempting to match the at least one image characteristic with the at least one of the plurality of image characteristics of the plurality of images so as to yield a group of visually similar images, wherein the processing infrastructure performs adult image filtering.

2. The online search system of claim 1, wherein the at least one of the plurality of image characteristics define a plurality of visual similarities.

3. The online search system of claim 1, wherein at least a first of the plurality of image characteristics define a visual image type.

4. The online search system of claim 3, wherein the visual image type includes a graphics image type.

5. The online search system of claim 3, wherein the visual image type includes an architectural image type.

6. The online search system of claim 3, wherein the visual image type includes a portrait image type.

7. The online search system of claim 3, wherein the visual image type includes a cartoon image type.

8. The online search system of claim 3, wherein the visual image type includes a landscape image type.

9. An online search system that services both a plurality of web hosting servers and a plurality of user computing devices via an Internet, the online search system comprising:
  a processing infrastructure configured to crawl each of the plurality of web hosting servers to gather a plurality of images, the processing infrastructure associates at least one of a plurality of image characteristic with each of the plurality of images;
  a communication interface through which a user interface setting and an uploaded search image are received by the processing infrastructure, the user interface setting identifying one of a first setting and a second setting; and
  the processing infrastructure configured to respond to the first setting identified via the user interface setting by attempting to match the uploaded search image with each of the plurality of images, and the processing infrastructure configured to respond to the second setting identified via the user interface setting by (i) analyzing the uploaded search image to identify at least one image characteristic, and (ii) attempting to match the at least one image characteristic with the at least one of the plurality of image characteristics of the plurality of images so as to yield a group of visually similar images, wherein the generation of the search results is based in part on a comparison process associated with text data associated with each of the plurality of images.

10. An online search system that gathers a plurality of images from a plurality of web hosting servers in a crawling process, the online search system comprising:
  a communication interface which receives first search request data and second search request data, the first search request data relating to a first uploaded search image, and the second search request data relating to both a second uploaded search image and related user setting data;
  a processing infrastructure that responds to the first search request data by attempting to match first uploaded search image with each of the plurality of images; and
  the processing infrastructure responds to the second search request data by analyzing the second uploaded search image and, based on the analysis, producing a search results which includes images with visual characteristic similarities corresponding to the second uploaded search image, wherein the generation of the search results is based in part on a comparison process associated with text data associated with each of the plurality of images.

11. The online search system of claim 10, wherein the visual characteristic similarities being associated with graphic images.

12. The online search system of claim 10, wherein the visual characteristic similarities being associated with architectural images.

13. The online search system of claim 10, wherein the visual characteristic similarities being associated with portrait images.

14. The online search system of claim 10, wherein the visual characteristic similarities being associated with cartoon images.

15. The online search system of claim 10, wherein the visual characteristic similarities being associated with landscape images.

16. An online search system that gathers a plurality of images from a plurality of web hosting servers in a crawling process, the online search system comprising:
  a communication interface which receives first search request data and second search request data, the first search request data relating to a first uploaded search image, and the second search request data relating to both a second uploaded search image and related user setting data;
  a processing infrastructure that responds to the first search request data by using the first uploaded search image in a first process that yields first image based search results; and
  the processing infrastructure that responds to the second search request data by using the second uploaded search image in a second process that yields second image based search results, the second process being different from the first process, wherein the second process is based in part on a comparison process associated with text data associated with each of the plurality of images.

17. The online search system of claim 16, wherein the second search results comprises at least a reference to first images of the plurality of images, the first images and the second uploaded search image having at least one common characteristic.

18. The online search system of claim 17, wherein the at least one common characteristic being common to graphic images.

19. The online search system of claim 17, wherein the at least one common characteristic being common to cartoon images.

20. The online search system of claim 17, wherein the at least one common characteristic being common to landscape images.

21. The online search system of claim 17, wherein the at least one common characteristic being common to portrait images.

22. The online search system of claim 17, wherein the at least one common characteristic being common to architectural images.

23. A method performed by an online search system that gathers a plurality of images from a plurality of web hosting servers in a crawling process, the online search system comprising:
  receiving first search request data and second search request data, the first search request data relating to a first uploaded search image, and the second search request data relating to both a second uploaded search image and related user setting data;
  responding to the first search request data by using the first uploaded search image in a first process that yields first image based search results; and
  responding to the second search request data by using the second uploaded search image in a second process that yields second image based search results, the second process being different from the first process, wherein the second process is based in part on a comparison process associated with text data associated with each of the plurality of images.

24. The method of claim 23, wherein the second image based search results comprises at least a reference to a plurality of first images of the plurality of images, the first images and the second uploaded search image having at least one common characteristic.

25. The method of claim 24, wherein the at least one common characteristic being common to graphic images.

26. The method of claim 24, wherein the at least one common characteristic being common to cartoon images.

27. The method of claim 24, wherein the at least one common characteristic being common to landscape images.

28. The method of claim 24, wherein the at least one common characteristic being common to portrait images.

29. The method of claim 24, wherein the at least one common characteristic being common to architectural images.

* * * * *